United States Patent
Savary et al.

(10) Patent No.: US 12,044,410 B2
(45) Date of Patent: Jul. 23, 2024

(54) INTEGRAL FLOW RATE LIMITER AND FUEL INJECTOR FOR A GAS TURBINE COMBUSTOR

(71) Applicant: SAFRAN HELICOPTER ENGINES, Bordes (FR)

(72) Inventors: Nicolas Roland Guy Savary, Moissy-Cramayel (FR); Christophe Lailhacar, Moissy-Cramayel (FR); Olivier Lamaison, Moissy-Cramayel (FR); Stéphane Lavignotte, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/801,766

(22) PCT Filed: Feb. 23, 2021

(86) PCT No.: PCT/FR2021/050313
§ 371 (c)(1),
(2) Date: Aug. 23, 2022

(87) PCT Pub. No.: WO2021/170947
PCT Pub. Date: Sep. 2, 2021

(65) Prior Publication Data
US 2023/0151768 A1 May 18, 2023

(30) Foreign Application Priority Data
Feb. 24, 2020 (FR) ........................................ 2001817

(51) Int. Cl.
*F23R 3/28* (2006.01)
*F02C 7/22* (2006.01)
*F02C 9/26* (2006.01)

(52) U.S. Cl.
CPC .............. *F23R 3/283* (2013.01); *F02C 7/222* (2013.01); *F02C 9/26* (2013.01); *F02C 7/22* (2013.01)

(58) Field of Classification Search
CPC .............. F23R 3/28; F23R 3/283; F23R 3/286
See application file for complete search history.

(56) References Cited

U.S. PATENT DOCUMENTS 6,076,356 A * 6/2000 Pelletier .................. F23D 11/36
60/800
6,276,141 B1 * 8/2001 Pelletier .................. F23D 11/36
60/800

(Continued)

FOREIGN PATENT DOCUMENTS

| CA | 2981540 A1 | 10/2016 |
|----|------------|---------|
| FR | 3059047 A1 | 5/2018 |

OTHER PUBLICATIONS

International Search Report mailed May 17, 2021, issued in corresponding International Application No. PCT/FR2021/050313, filed Feb. 23, 2021, 2 pages.

(Continued)

*Primary Examiner* — William H Rodriguez
(74) *Attorney, Agent, or Firm* — Christensen O'Connor Johnson Kindness PLLC

(57) ABSTRACT

A combustion assembly for a gas turbine includes a flame tube and a fuel supply including a flow rate limiter supplying an injector. The flow rate limiter and the fuel injector are formed in one piece.

6 Claims, 2 Drawing Sheets

(56) References Cited

U.S. PATENT DOCUMENTS

| | | | | |
|---|---|---|---|---|
| 6,321,541 | B1 * | 11/2001 | Wrubel | G11C 7/222 60/740 |
| 6,523,350 | B1 * | 2/2003 | Mancini | F23R 3/28 123/468 |
| 6,711,898 | B2 * | 3/2004 | Laing | F23R 3/34 60/740 |
| 6,718,770 | B2 * | 4/2004 | Laing | F23R 3/343 239/548 |
| 7,028,483 | B2 * | 4/2006 | Mansour | F02C 7/22 60/740 |
| 7,841,368 | B2 * | 11/2010 | McMasters | F23R 3/283 138/109 |
| 9,046,039 | B2 * | 6/2015 | Williams | F23D 11/107 |
| 9,228,741 | B2 * | 1/2016 | Buelow | F23R 3/346 |
| 9,310,073 | B2 * | 4/2016 | Buelow | F23R 3/343 |
| 9,383,097 | B2 * | 7/2016 | Thomson | F23R 3/28 |
| 10,337,413 | B2 | 7/2019 | Falgareiro et al. | |
| 10,364,751 | B2 * | 7/2019 | Ryon | F23R 3/346 |
| 2002/0129606 | A1 * | 9/2002 | Wrubel | F23R 3/283 60/746 |
| 2002/0189259 | A1 * | 12/2002 | Laing | F23R 3/34 60/746 |
| 2003/0221429 | A1 * | 12/2003 | Laing | F23R 3/343 60/740 |
| 2012/0047903 | A1 * | 3/2012 | Williams | F02C 9/34 60/746 |
| 2012/0228397 | A1 * | 9/2012 | Thomson | F23D 11/107 239/553 |
| 2016/0376996 | A1 * | 12/2016 | Mironets | B33Y 80/00 164/76.1 |
| 2018/0328588 | A1 | 11/2018 | Lemon et al. | |
| 2022/0235937 | A1 * | 7/2022 | Savary | F02C 7/22 |
| 2023/0358405 | A1 * | 11/2023 | Knapton | F02C 7/222 |

OTHER PUBLICATIONS

Written Opinion of the International Searching Authority mailed May 17, 2021, issued in corresponding International Application No. PCT/FR2021/050313, filed Feb. 23, 2021, 5 pages.

Rapport de Recherche Préliminaire / Opinion Écrite sur la Brevetabilité de L'Invention dated Oct. 19, 2020, issued in corresponding French Application No. 2001817, filed Feb. 24, 2020, 5 pages.

International Preliminary Report on Patentability mailed Aug. 30, 2022, issued in corresponding International Application No. PCT/FR2021/050313, filed Feb. 23, 2021, 1 page.

* cited by examiner

INTEGRAL FLOW RATE LIMITER AND FUEL INJECTOR FOR A GAS TURBINE COMBUSTOR

TECHNICAL FIELD

The present disclosure relates to a combustion assembly for a turbomachine.

BACKGROUND OF THE DISCLOSURE

A turbomachine conventionally includes, from upstream to downstream in the direction of gas circulation within the turbomachine, a fan, one or more compressor stages, for example a low-pressure compressor and a high-pressure compressor, a chamber combustion, one or more turbine stages, for example a high pressure turbine and a low pressure turbine, and a gas exhaust nozzle.

The combustion chamber is delimited by internal and external revolution casings which are coaxial and connected upstream to a chamber bottom annular casing. The outer casing of the chamber is fastened on an outer envelope of the turbomachine, the inner casing of the chamber being fastened on an inner envelope or connected to the outer casing.

The combustion chamber moreover comprises a flame tube or hearth, which is the seat of the combustion of the gases.

The fuel supply of the flame tube is carried out by a plurality of fuel injection devices which open into the flame tube. Each injection device comprises a fuel flow rate limiter which allows, due to its shape, controlling the fuel flow rate supplying downstream a fuel injector, one downstream end of which opens into the flame tube.

Conventionally, the fuel flow rate injector and the fuel flow rate limiter are made independently due to their complex three-dimensional conformation. However, the dissociation of the manufacture of the part carrying out the supply of the injector which in turn carries out the mixture of the fuel with the air for its spraying in the room does not make optimal the placement of the limiter relative to the injector such that an impact may result in the fuel spraying into the flame tube.

SUMMARY OF THE DISCLOSURE

The present disclosure thus relates to a combustion assembly for a gas turbine comprising a flame tube and fuel supply means including a flow rate limiter supplying an injector, characterised in that the flow rate limiter and the fuel injector are formed in one piece.

This embodiment provides an optimal placement of the fuel spray injector relative to the flow rate limiter so as to have an optimal combustion in the flame tube. The flow rate limiter and the fuel injector are advantageously manufactured by additive manufacturing which may be of the laser powder fusion type.

The flow rate limiter may comprise a first fuel conduit and a second fuel conduit each comprising a succession of chambers which are interconnected by reduced cross-sectional portions, the first conduit and the second conduit being connected to a fuel inlet, the first conduit opening downstream into a first channel of the fuel injector and the second conduit opening downstream into a second channel of the injector.

The series arrangement of the chambers allows for obtaining a better flow rate metering accuracy only if a single hole is made with the same production tool by statistical dispersion effect. This is particularly true for the injectors made by additive manufacturing, whose manufacturing tolerances on isolated orifices are not compatible with those of a fuel metering. Thus, by multiplying the chambers and the reduced section portions in series, it is possible to average the shape defects resulting from an additive manufacturing, which allows obtaining the desired final accuracy which can be all the better, the greater the number of chambers and reduced section portion of orifices in series is.

The first conduit and the second conduit can extend in one plane and more particularly in the same plane. This arrangement called "flat" arrangement allows an integration of the first and second conduits into an already existing flange for fastening the injector, without addition of space requirement and weight.

The fuel injector may have a substantially L-shape, a first branch of which includes the first channel including an upstream end which is connected to the first conduit of the flow rate limiter and a downstream end which opens into a first fuel outlet end piece, and a second branch of which includes a second fuel outlet end piece which is connected to a downstream end of a second channel which extends in the first branch and in the second branch.

BRIEF DESCRIPTION OF THE DRAWINGS

Other features, details and advantages will appear on reading the detailed description below, and on analysing the appended drawings, in which.

DESCRIPTION OF THE EMBODIMENTS

The drawings and the description below contain, essentially, elements of a certain character. They may therefore not only be used to better understand this disclosure, but also contribute to its definition, where appropriate.

Figure 1:
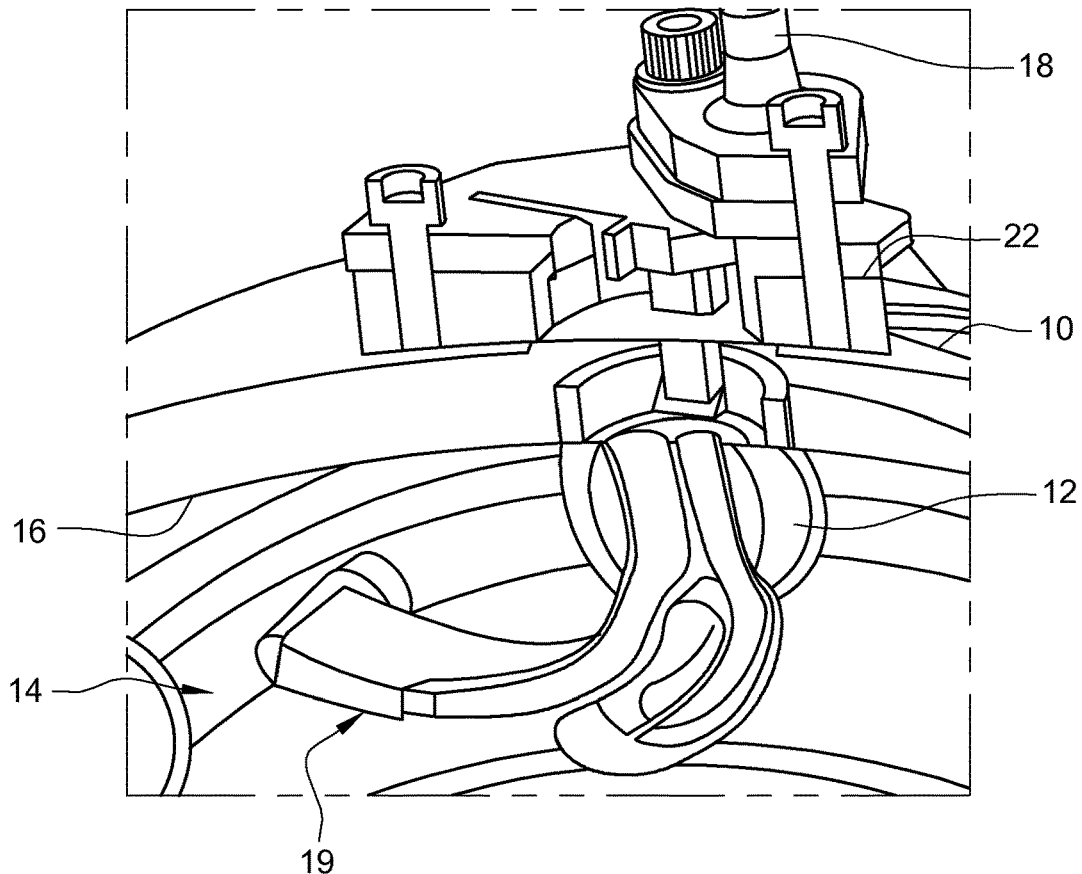
FIG. 1 is a schematic perspective view of a combustion assembly according to the disclosure.

FIG. 1 represents a casing 10 and a combustion assembly 12 according to the present disclosure which is supported by the casing 10. As shown in FIG. 1, the combustion assembly 12 comprises a flame tube 14 inside which fuel supply means open. The flame tube 14 comprises an inner annular shroud (not visible) and an outer annular shroud 16. These fuel supply means comprise a flow rate limiter 18 supplying fuel to a fuel injector 19. More specifically, the flow rate limiter 18 comprises a base 20 or a radially outer plate which is fastened on the outer face of a boss 22 of the casing 10 in order to ensure a positioning reference of the flow rate limiter 18 on the casing 10. The fuel injector 19 has a substantially L-shape formed by a first branch 19a and a second branch 19b which are connected to each other.

Figure 2:
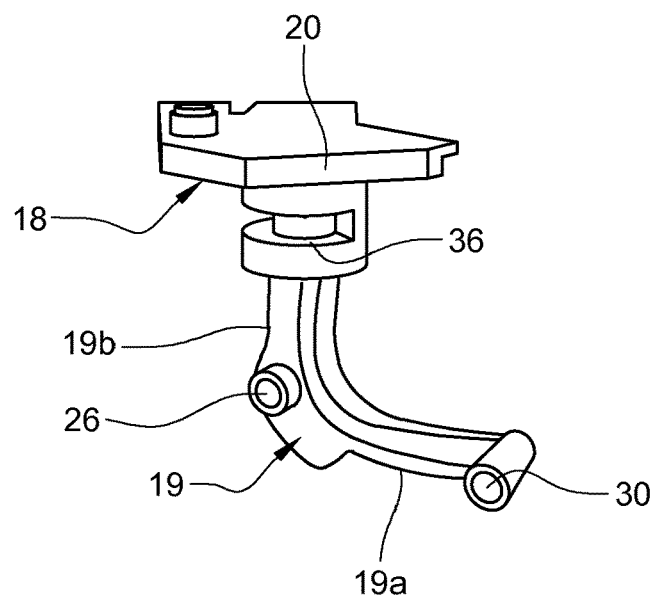
FIG. 2 is a schematic perspective representation of fuel supply means according to the disclosure.
Figure 3:
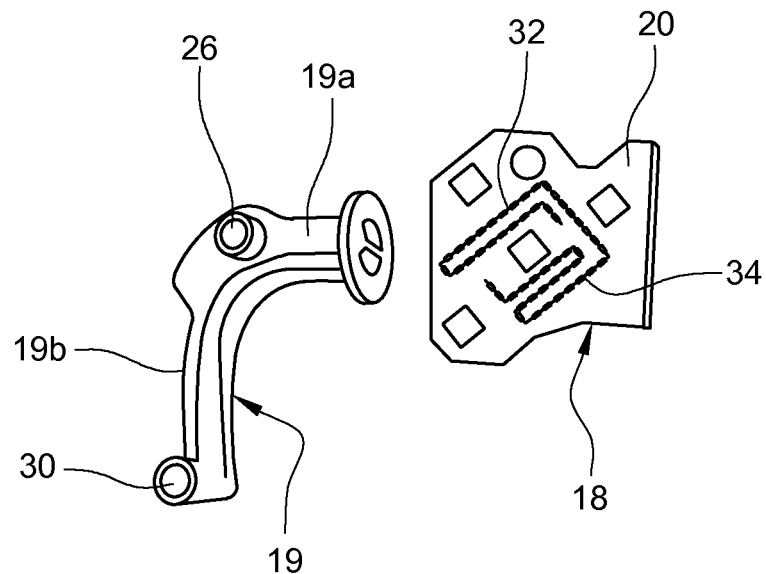
FIG. 3 is a schematic perspective representation with a cut-out of the part of FIG. 2.
Figure 4:
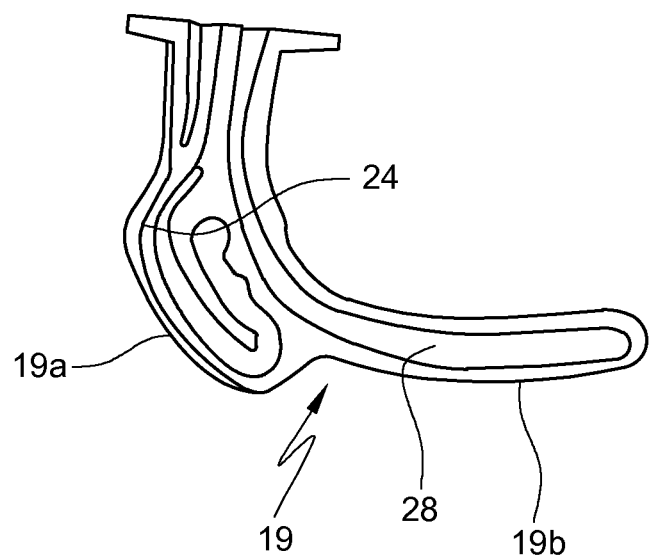
FIG. 4 is a schematic sectional view of the fuel injector.

As shown in FIGS. 2 to 4, the injector 19 which is herein a fuel pre-vaporisation pipe therefore comprises a first branch 19a inside which a first channel 24 of flow of an air/fuel mixture, which exits at the downstream end of the first channel 24 via a first end piece 26, is formed. A second channel 28 extends into the first branch 19a and into the second branch 19b and opens at the downstream end thereof into a second end piece 30. The first channel 24 is supplied with fuel by a first conduit 32 of the flow rate limiter and the second channel 28 is supplied with fuel by a second conduit 34 of the flow rate limiter 18.

The flow rate limiter 18 thus comprises the first fuel conduit 32 and the second fuel conduit 34 which are separate from each other. These two fuel conduits 32, 34 are supplied by a common fuel source, but comprise distinct fuel outlets. The first conduit 32 opens at the outlet facing the upstream end of the first channel 24 of the injector 19. The second conduit 34 opens at the outlet facing the upstream end of the second channel 28 of the injector 19. The first conduit 32 and the second conduit 34 each comprise a succession of chambers interconnected by portions of reduced cross-section.

As shown in FIG. 3, the first conduit 32 and the second conduit 34 extend in one plane and in the example represented in the same plane. This arrangement called "flat" arrangement allows an integration of the first 32 and second 34 conduits into an already existing flange for fastening the injector, without addition of space requirement and weight.

As shown in FIG. 1 and in FIG. 2, an air inlet 36 is provided at the junction of the fuel injector 19 and the fuel limiter 18. This air inlet 36 is arranged in the annular space formed between the casing 10 and the outer shroud 16.

According to the present disclosure, the injector 19 and the limiter 18 are manufactured in one piece, for example by additive manufacturing. In particular, it is possible to consider manufacturing this part by laser powder fusion.

The invention claimed is:

1. A combustion assembly for a gas turbine comprising a flame tube and a fuel supply including a flow rate limiter supplying an injector, wherein the flow rate limiter and the fuel injector are formed in one piece, and wherein the flow rate limiter comprises a first fuel conduit and a second fuel conduit each comprising a succession of chambers which are interconnected by portions of reduced cross-section, the first conduit and the second conduit being connected to a fuel inlet, the first conduit opening downstream into a first channel of the fuel injector and the second conduit opening downstream into a second channel of the injector.

2. The assembly according to claim 1, wherein the fuel injector has a substantially L-shape, a first branch of which includes the first channel including an upstream end which is connected to the first conduit of the flow rate limiter and a downstream end which opens into a first fuel outlet end piece, and a second branch of which includes a second fuel outlet end piece which is connected to a downstream end of the second channel which extends in the first branch and in the second branch.

3. The assembly according to claim 1, wherein at least one air inlet is formed at the junction of the injector and the flow rate limiter.

4. A turbomachine comprising an assembly according to claim 1.

5. A method for manufacturing an assembly according to claim 1, comprising the step of making the flow rate limiter and the fuel injector by additive manufacturing.

6. The method according to claim 5, wherein the additive manufacturing is of the laser powder fusion type.

* * * * *